United States Patent Office 3,320,078
Patented May 16, 1967

3,320,078
PROCESS FOR INSOLUBILIZING PROTEIN
Edward B. Dunning and Daniel P. Gilboe, Minneapolis, Minn., and Garson P. Shulman, Baltimore, Md., assignors to Archer-Daniels-Midland Company, Minneapolis, Minn., a corporation of Delaware
No Drawing. Filed Jan. 18, 1965, Ser. No. 426,441
11 Claims. (Cl. 106—124)

This invention relates to a method of insolubilizing proteins and to novel cross-linkable protein compositions. More particularly, this invention relates to protein compositions containing latent cross-linking agents.

It is well known to the art that formaldehyde will react with proteins to yield insoluble products or otherwise denature them. Although a great deal of speculation has arisen concerning the actual chemical reactions involved, their precise nature is still far from clear. Despite this fact, however, commercial processes of many kinds have been developed based upon this general reaction. Formaldehyde or acetaldehyde is used, for example, to insolubilize proteins for adhesive applications, paper coatings, fiber production, plastics manufacture, tanning, and the like. In all these operations, however, the process is difficult to control in view of the nature of the reaction occurring between the protein and the aldehyde. Aqueous solutions of aldehyde, furthermore, are difficult to handle. In view of the reactivity of the aldehyde, premature reaction between the aldehyde and the protein can readily occur and thus prevent the proper application of the protein composition. The inability to thoroughly suppress the reaction of the aldehyde with the protein at temperatures at which the protein composition is applied has severely limited the use of such compositions in industry.

Commercial processes for paper coating involve the treatment of paper with solutions of protein containing the aldehyde. If the aldehyde is too concentrated, immediate thickening of the solution results and the protein is rendered unavailable. Furthermore, on continuous running of such coating operations, protein solutions containing aldehyde have a tendency to thicken gradually so that operating conditions have to be varied and the coating bath eventually becomes useless. Moreover, the volatility of the aldehyde component of this coating mixture is such as to make rapid insolubilization by heating difficult to control. In commercial practice, therefore, the paper industry has resorted to separate treatments in order to achieve cross-linking by the reaction of casein, soya protein, or gelatin coatings with aldehyde.

Proteins have also been utilized as a binder for pigments in textile printing. They are then insolubilized with the aldehyde. If this insolubilization is carried out by passing the printed goods through steam and aldehyde vapors, there is danger that only a surface reaction will occur. If the aldehyde is added directly into the printing paste, although more durable fixation results, it is again difficult to control the coagulating effect of the aldehyde because it is necessary to steam the goods, or expose them to air, for a protracted period in order to develop insolubility and this process is likewise hard to control.

It is therefore one of the objects of the present invention to provide novel protein compositions capable of cross-linking. It is another object of the present invention to provide protein compositions containing latent cross-linking agents which are activated by heating. It is still a further object of this invention to provide methods for controlling the cross-linking reaction of protein such as not to interfere in the application or forming steps but to result in cross-linking on further heating after application. Other objects will become apparent hereinafter.

The novel compositions of the present invention comprise protein containing as a latent cross-linking agent an amine oxide having the general formula

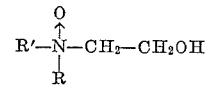

wherein R and R' are hydrocarbyl radicals of one to ten carbon atoms. The term "hydrocarbyl radical" as used herein is meant to include all monovalent hydrocarbon radicals.

The amine oxides employed in the present invention as latent cross-linking agents decompose when heated to a temperature of 70°–100° C. and release acetaldehyde which causes the cross-linking of the protein in which the amine oxide is dispersed. The cross-linking of the protein is evidenced by gelation. At temperatures below about 70° C. no significant cross-linking occurs in the composition of the present invention, and thus proteins containing the latent cross-linking agents of the present invention can readily be fabricated or applied at temperatures below about 70° C. The latent cross-linking agents of the present invention are active as cross-linking agents when in contact with protein regardless of the particular physical state of the protein. The cross-linking agents, therefore, can be employed in solutions of protein, dispersions of protein, or in admixture with a dry protein itself. The quantity of the cross-linking agent employed in the compositions of the present invention will differ depending on the degree of cross-linking or insolubilization desired. In general the range of the cross-linking agent is from 0.1 to 10 percent by weight based on the protein to which the cross-linking agent is added. It will be apparent that optimum concentrations in each particular application can be readily established by experimental procedure.

The origin and nature of the protein employed in the compositions of the present invention is not critical. Thus, the protein may be of animal or vegetable origin and also includes mixtures thereof. The term vegetable proteins is meant to include flours of such oleaginous seeds as soybean, peanut, cottonseed, linseed, sesame seed, castor beans, sunflower seed, safflower seed, and the like. The term animal protein is meant to include not only milk casein and hide and bone glue, but also blood albumin, gelatin, fish glue, egg albumin, and the like. The preferred proteins employed in the compositions of the present invention comprise the oil seed proteins and, more particularly, soybean proteins. It will be apparent that the proteins usable in the process of the present invention need not be pure proteins but can be proteinaceous materials that contain, in addition to the protein, considerable quantities of inert ingredients, e.g., up to 50 percent, which do not affect the described cross-linking reaction.

The amine oxides employed in the compositions of the present invention can be prepared by the reaction of dihydrocarbyl ethanolamine with hydrogen peroxide. The preferred amine oxides are in particular dimethylethanolamine oxide, methylethylethanolamine oxide, methylpropylethanolamine oxide, ethylpropylethanolamine oxide, dipropylethanolamine oxide, methylbutylethanolamine oxide, dibutylethanolamine oxide, and diethylethanolamine oxide and other lower alkylethanolamine oxides.

The addition of the amine oxide to the protein is readily accomplished by using means heretofore developed for the addition of chemical reagents to proteins. It is in general preferred to add the amine oxide to a dispersion or solution of the protein in water at a pH above 7. The preparation of such solutions or dispersions is also well known in the art. Protein dispersions or solutions containing the amine oxide are stable at room temperature but when heated to temperatures above 70° C. such dispersions or solutions gel within a short time, showing that cross-linking has occurred.

The preparation of the compositions of the present invention is further illustrated by the following examples, which, however are not to be construed as being limitative of the invention.

*Example 1*

To 80 parts of water is added 20 parts of solvent-extracted soybean meal, and the resulting mixture is agitated at 70–80° F. To this mixture is then added 0.5 percent of a commercially available defoamer (Nopco 1819-L) and 2 percent of sodium hydroxide, based on the weight of the soybean meal, to result in a pH of 10–10.5. To the dispersion is then added 0.87 weight percent, based on the soybean meal content, of N,N-dimethylethanolamine oxide. The resulting slurry is stable and remains so as long as no heat is applied.

The slurry is then heated slowly (3° F. per minute) in a Corn Industries' Viscosimeter. At 165°–175° F. the slurry gels rapidly and on cooling the gel is firm and solid.

*Example 2*

The procedure of Example 1 is repeated except that 2.0 percent of N,N-dimethylethanolamine oxide is employed. The same results are obtained except that the gelation of the mixture on heating occurs at 155°–165° F.

*Example 3*

The procedure of Example 1 is repeated except that a cottonseed flour is used instead of the soybean flour. Gelling of the composition occurs at substantially the same temperature as in Example 1.

*Example 4*

The procedure of Example 1 is repeated using a milk casein instead of the soybean meal. Gelling of the resulting composition is obtained at substantially the same temperature indicated in Example 1.

*Example 5*

The procedure of Example 1 is repeated using 2 percent of N,N-diethylethanol amine oxide. Gelling of the soybean composition occurs at temperatures above 165° F.

The foregoing examples have illustrated the forming of the compositions of the present invention and the effect of heat on the compositions containing the latent cross-linking agents of the present invention. It is to be understood that the manner in which the mixing of the latent cross-linking agent with the protein is carried out is not critical from a standpoint of the operability of the composition of the present invention. The method illustrated in the foregoing example, however, is applicable to all of the compounds encompassed in the hereinabove given definition of the latent cross-linking agent. Similarly, other proteins not specifically illustrated may be employed instead of the specifically illustrated proteins.

In solution or dispersion form, the compositions of the present invention have utility as adhesives, sizing compositions, coatings, and similar applications requiring the protein to be in liquid form. The compositions of the present invention can further be employed as molding compositions in which event the latent cross-linking agents are preferably incorporated into the solid protein in the form of solution, employing a readily vaporizable solvent.

What is claimed is:

1. A composition comprising a protein containing a compound having the formula

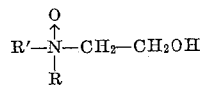

wherein R and R' are hydrocarbyl radicals having from one to ten carbon atoms.

2. A protein composition comprising a protein and from 0.1 to 10 percent by weight of the protein of a compound having the general formula

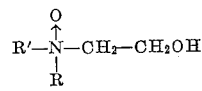

wherein R and R' are hydrocarbyl radicals of one to ten carbon atoms.

3. A vegetable protein containing from 0.1 to 10 percent by weight of the protein of a compound having the general formula

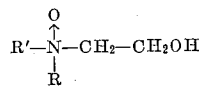

wherein R and R' are hydrocarbyl radicals of one to ten carbon atoms.

4. A cross-linkable protein composition comprising protein and from 0.1 to 10 percent, by weight of the protein, of N,N-dimethylethanolamine oxide.

5. A cross-linkable protein composition comprising protein and from 0.01 to 10 percent by weight of N,N-diethylethanolamine oxide.

6. The composition of claim 3 wherein the protein is a soybean protein.

7. The process of cross-linking proteinaceous materials which comprises admixing said proteinaceous material with a compound having the general formula

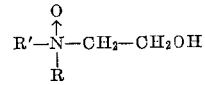

wherein R and R' are hydrocarbyl radicals of one to ten carbon atoms at a temperature below 70° C. and heating said composition to a temperature in the range of 70 to 100° C.

8. The process of claim 7 wherein the compound is employed in a concentration of 0.1 to 10 percent by weight of the protein in said proteinaceous material.

9. The process of claim 7 in which the protein is a vegetable protein.

10. The process of claim 9 wherein the vegetable protein is a soybean protein.

11. The process of claim 9 in which the cross-linking agent is N,N-dimethylethanolamine oxide.

References Cited by the Examiner

UNITED STATES PATENTS 3,085,982  4/1963  Sateer et al. _____ 252—137
3,098,794  7/1963  Dohr et al. _____ 167—87

ALEXANDER H. BRODMERKEL, *Primary Examiner.*

T. MORRIS, *Assistant Examiner.*